United States Patent [19]
Alpha et al.

[11] Patent Number: 5,409,660
[45] Date of Patent: Apr. 25, 1995

[54] SINTERING METAL PARTS WITH A RELEASE AGENT

[75] Inventors: Christopher G. Alpha, Honolulu, Hi.; Leslie E. Hampton; David S. Weiss, both of Corning, N.Y.

[73] Assignee: Corning Incorporated, Corning, N.Y.

[21] Appl. No.: 44,640

[22] Filed: Apr. 8, 1993

[51] Int. Cl.6 .............................. B22F 7/00; B22F 1/02
[52] U.S. Cl. ........................................ 419/5; 419/35; 419/38
[58] Field of Search .......................... 419/5, 1, 35, 38

[56] References Cited

U.S. PATENT DOCUMENTS

| | | | |
|---|---|---|---|
| 3,658,517 | 4/1972 | Davies et al. | 75/200 |
| 3,932,681 | 1/1976 | Forker, Jr. et al. | 427/282 |
| 4,582,677 | 4/1986 | Sugino et al. | 419/2 |
| 4,758,272 | 7/1988 | Pierotti et al. | 75/246 |
| 4,992,233 | 2/1991 | Swaroop et al. | 419/2 |

FOREIGN PATENT DOCUMENTS

0488716A1 11/1991 European Pat. Off. .

Primary Examiner—Edward A. Miller
Assistant Examiner—Scott T. Bluni
Attorney, Agent, or Firm—L. Rita Quatrini

[57] ABSTRACT

A release agent for producing sintered metal parts using the release agent. The method includes applying a release agent to contacting surfaces of at least two green metal parts, forming an assembly of the parts, sintering the assembly, and separating the parts which are in contact with the release agent. The release agent is a mixture of alumina and a vehicle having a vaporization temperature of less than about 100° C. at atmospheric pressure, and is nonreactive with the alumina and the green metal parts. When at least one of the parts having a contacting surface is a honeycomb structure, the median particle diameter of the alumina is no greater than about 3 micrometers.

17 Claims, No Drawings

SINTERING METAL PARTS WITH A RELEASE AGENT

This invention relates to a release agent and its use in making sintered metal parts. The release agent provides for excellent separation of sintered parts and does not adversely affect oxidation resistance. The agent is especially suited in the sintering of metal honeycombs.

BACKGROUND OF THE INVENTION

Metal honeycombs for exhaust system applications are made from metal powders which are mixed together, extruded and then sintered to the desired density. Such components can be made of various extruded elements which are joined together in the green (extruded and dried, but not fired) state and then sintered together to an integral structure. For example, preheaters are made from a metal honeycomb body with two rods or bars joined at the ends to serve as electrodes. When a green part is placed in the furnace for sintering, it must be supported by sacrificial pieces of extruded metal which allow for the shrinkage that takes place during densification (up to about 20 linear % for some bodies) without distortion of either the fine honeycomb structure or the attached pieces (if there are any). In addition, sacrificial pieces are used to insulate the part from unwanted interactions with contaminants in the furnace gas.

The sacrificial pieces must be removed after firing. However, extruded metal parts that are in contact during the sintering process tend to sinter together (bond) making their separation difficult or impossible. Thus, sacrificial pieces can become joined to the fired parts during sintering and are not removable without damage to both.

Release or parting agents can be used to keep parts from sintering together. Applied to one or both of the mating surfaces, the release agent prevents bonding between the surfaces themselves and/or between the surfaces and the release agent. Therefore, the release agent must keep the surfaces apart and be unreactive with the material of which the surfaces are made. In the case of greenware, that is complicated by the fact that physical and chemical reactions take place during sintering that change the nature of the surfaces which are to be kept apart. Furthermore, there must be no reactivity throughout the entire temperature range of the sintering process.

In the case of an FeCrAl alloy, the release agent must not form any reaction product with any of the batch components throughout the sintering temperature range. Specifically with respect to oxygen, the presence of aluminum in the alloy means that if the release agent is an oxide, it must be as stable as, or more stable than, alumina and have no reactivity with alumina. For example, silica-containing powders can not be used because the silica will be reduced by aluminum during the heating process. Some commonly used release agents such as molybdenum and graphite powder or spray cannot be used because of unwanted reactions with the metal bodies.

Another release agent is boron nitride spray which works well to keep parts from sintering together, but reacts with the fired metal bodies during sintering and/or subsequent oxidation steps, leading to accelerated oxidation. Since excellent oxidation resistance is a critical attribute for some applications (e.g., exhaust system components), degradation of oxidation resistance is an unacceptable price to pay for a release agent.

Loose alumina powder can be used to keep parts from bonding together during sintering, but it can only be applied to surfaces that are "up" with respect to the furnace hearth plate (i.e., top surfaces of the parts) during firing. Also, loose alumina powder can be released inside the furnace with detrimental effects.

The release agent must not cause cell deformation during sintering-induced shrinkage. Such deformation can result from a powder release agent with excessively coarse grain size in which case parts ride on individual grains, exerting excess stress on thin and fragile honeycomb surfaces.

Accordingly, there remains a need to improve upon release agents that are used in sintering of metal parts which will cause separation of the parts without damage to the parts, and which will not adversely affect oxidation resistance.

The present invention provides such a release agent.

SUMMARY OF THE INVENTION

In accordance with one aspect of the invention, there is provided a release agent suitable for application to contacting surfaces of green metal parts prior to sintering, and for allowing the parts to be separated after sintering. The release agent is a mixture of alumina and a vehicle having a vaporization temperature of less than about 100° C. at atmospheric pressure, and is nonreactive with the alumina and the green metal parts. When at least one of the parts having a contacting surface is a honeycomb structure, the median particle diameter of the alumina is no greater than about 3 micrometers.

DETAILED DESCRIPTION OF THE INVENTION

This invention relates to a release agent suitable for application to contacting surfaces of green metal parts or bodies prior to sintering. Use of the release agent of the present invention allows the parts to be cleanly separated after sintering without any appreciable loss of oxidation resistance and without damage to the product parts.

The sintered bodies of the present invention can be used in high temperature applications in oxidizing atmospheres, such as for example, in carriers for catalysts for exhaust gas purification, etc., heaters, e.g., catalyzed heaters, or electrically heated catalysts, catalytic converters, etc. The present invention is especially suited in the making of complex structures involving one or more honeycomb structures. Honeycombs are multicellular bodies with walls or webs between the cells.

The release agent is a mixture of alumina and a vehicle which readily evaporates during the sintering process.

The alumina must be high purity. Advantageously, it has little or no Si contamination, e.g., no greater than 0.02 wt. % $SiO_2$. The alumina should be fine alumina. By fine alumina is meant a median particle diameter of no greater than about 5 micrometers. The fine particle size of the release agent alumina powder provides enough surface area to evenly distribute the weight of one part against another. For example, in honeycombs in which one part is atop the other, the weight of the upper part is evenly distributed over the web surfaces of the lower part. When at least one of the parts having a contacting surface is a honeycomb structure, the median particle diameter is no greater than about 3 micrometers. As a general rule for most parts, and especially when one of the parts having a contacting surface is a honeycomb with wall thicknesses of about 0.10 to about 0.20 millimeters in the green state, the median particle diameter of the alumina is advantageously no greater than about 1.5 micrometers, and more advantageously no greater than about 0.5 micrometers. A preferred alumina is one having a particle size distribution of about 90% of the particles being $\leq 1$ μm, about 50% $\leq 44$ μm, and about 10% $\leq 19$ μm, as determined by sedigraph analysis. One preferred source of such alumina is supplied by Alcoa under the name of A-16.

The vehicle is a liquid medium for dispersing the alumina for uniform application of the alumina to the desired surfaces of the bodies. The vehicle must be able to disperse the alumina without dissolving it or changing its particulate nature. The vehicle must be essentially non-reactive with the alumina and non-reactive with the green metal body. The vehicle must have a vaporization temperature that will allow it to function as a liquid medium for the alumina at operating temperatures but which will allow it to readily and cleanly evaporate after application of the alumina to the parts. Accordingly, the vaporization temperature of the medium at atmospheric pressure is less than about 100° C. and advantageously about 50° C. to less than about 100° C. Some vehicles that can be used in the practice of the present invention, although it is to be understood that the invention is not limited to these, are those of the alkanes, alkenes, alkynes, alcohols, amines, aromatics, esters, ketones, halogenated compounds, and combinations thereof, whose vaporization temperatures within the above described temperatures, and which are non-reactive with alumina and non-reactive with the body. Also included are derivatives of the above classes of vehicles that fulfill these requirements. Choice of vehicle depends on environmental, safety, economic, and availability factors. Alcohols are advantageous. Some examples of alcohols are methyl, ethyl, propyl, isopropyl, secondary butyl, and tertiary butyl alcohols, and combinations thereof, with isopropyl alcohol being the preferred vehicle. The relative amounts of alumina and vehicle are chosen to result in the best handleability for the specific vehicle. The alumina/vehicle ratio should not be so high as to make the mixture too thick to apply to the body surfaces involved, or so low that the mixture is too thin to deliver the proper amount of alumina release agent to the body surfaces involved.

In accordance with a preferred embodiment, the vehicle is isopropyl alcohol. It is advantageous that the weight ratio of alumina to isopropyl alcohol be greater than about 1:7.5 to about 5:4. Ratios 1:1.75 or less are too thin, the alumina is not kept in suspension to form a satisfactory coating, and the isopropyl alcohol evaporates readily before application of the mixture. Ratios of about 5:2 or greater are too thick to apply. The ratio is advantageously about 1:6 to about 5:4, and more advantageously about 1:5 to about 1:1 because the consistency of the mixture is generally good and the separation after sintering is good. Most advantageously the ratio is 1:5 because it results in the least residue after sintering.

In accordance with one embodiment of the present invention, the release agent is used in making of sintered metal parts from green parts. It is applied to those green part surfaces which are not to be joined together in the sintering.

The term "green" is used in the art and in this application to refer to the state of a formed body made of sinterable powder or particulate material that has not yet been fired to the sintered state.

A plurality of green metal parts or bodies is provided. At least one part is provided which will be the final product after sintering. Such a part will be referred to as a product part or product body. At least one part is provided which will be called a sacrificial part. The purpose of the sacrificial part is to support the product part and to allow for the shrinkage that takes place during densification without distortion of the product part. In addition, sacrificial parts are used to insulate the product part from unwanted interactions with furnace contaminants. The green product parts can be sintered as single pieces, or component product parts can be assembled into any complex shape product body. If a complex sintered body is to be made from component green bodies, the green bodies are assembled to form the desired complex shape by being put in contact with one another. The joining of the component parts is promoted by insuring that the mating surfaces are flat, co-parallel, and free of dirt and other contamination. The release agent of the present invention is applied to the surfaces of the product bodies and/or to the surface(s) of the sacrificial part(s) that are to be in contact with one another during sintering, but which are to be separated after sintering. The product and sacrificial parts are sintered under conditions which depend on the material, body shape and size, etc. to form a densified body or bodies. The sacrificial parts are removed after sintering.

Use of the release agent of the present invention insures that the sacrificial parts are removed cleanly, which parts could otherwise sinter together (bond), making their separation difficult or impossible, or result in damage to the parts.

In accordance with a preferred embodiment, the release agent is especially suited for use in making sintered honeycomb bodies. Some examples of honeycombs, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Typical wall (web) thicknesses in catalytic converter applications, for example, are about 5 mils (about 0.13 mm) for 400 cells/in$^2$ (62 cells/cm$^2$) honeycombs. Web thicknesses range typically from about 4 to about 25 mils (about 0.1 to about 0.6 mm). The external size and shape of the body is controlled by the application.

It is contemplated that any sinterable metal or metal composition can be used in the practice of the present invention. Especially suited are iron group metal and aluminum compositions, with the preferred iron group metal Q being iron. Especially preferred is Fe, Al, and Cr. For example, Fe5-20Al15-40Cr, and Fe7-10Al10-20Cr powders with other possible additions are especially suited. Some typical compositions of metal powders are disclosed in U.S. Pat. Nos. 4,992,233, 4,758,272, and European patent application publication no. 488716A1, which are herein incorporated by reference as filed. U.S. Pat. No. 4,992,233 relates to methods of producing porous sintered bodies made from metal powder compositions of Fe and Al with optional additions of Sn, Cu, and Cr. European patent application publication no. 488716A1 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as e.g., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe—Cr—Al—(Y, lanthanide series elements, Zr, Hf, or Cu) alloy powder, Cr—Al—(Y, lanthanide series elements, Zr, Hf, or Cu) alloy powder, Fe-B, Fe-Si powder, etc.

The particle size of the starting powders depends on the end product that is to be produced. For example, if honeycombs are to be produced having (as sintered) about 2 cells/cm$^2$, (about 400 cells/in$^2$) and about 180 micrometer thick cell walls, the particle size is typically but not exclusively, about 44 micrometers in diameter or less. If honeycombs are to be produced having about 47 cells/cm$^2$ (about 300 cells/in$^2$) and about 250 micrometer thick walls, the particle size is typically but not exclusively, about 53 micrometers in diameter or less. If honeycombs are to be produced having about 31 cells/cm$^2$ (about 200 cells/in$^2$), and about 300 micrometer thick walls, the particle size is typically but not exclusively, about 74 micrometers in diameter or less.

A relatively uniform admixture is formed of the above metal powders and optionally, rare earth oxides. This is done typically by dry blending to form a homogeneous blend.

The admixture is formed into a green body. This can be done by any method known in the art, e.g., pressing, injection molding, extruding, etc., with extrusion being preferred. Depending on the forming method, binders, forming aids, and vehicles for the metal powder blend can be added as necessary. For example, non-aqueous binders such as acrylic resins with polyvinyl alcohol or silicon resins can be used with diacetone as the vehicle. Paraffin and other waxes are used in injection molding with stearic acid or glycerin as a lubricant. One preferred method of making the green body is to combine an organic binder, e.g., methyl cellulose, polyvinyl alcohol, etc. and vehicle for the metal powder, and optionally other aids, e.g., aids to prevent oxidation, to form a relatively homogeneous wet mixture. This is done typically by adding the binder and aid or aids (if used) to the admixture, and forming a dry blend. The vehicle is then added to form the wet mixture. One example of a binder/vehicle combination is methyl cellulose/water respectively. With this combination, it is preferred to add an organic acid such as oleic acid as an aid to prevent oxidation of the metal powders. One example of a binder/aid/vehicle combination is about 4 g methyl cellulose, about 1 g oleic acid and about 11 g to about 12 g water per about 100 g of the admixture composition. This mixture is formed into a green body by extruding. At this point, the body is usually dried, although this is not necessary. This is done typically by air drying.

If a complex shape is to be make from component bodies, the green bodies, whether dried or not, are now assembled to form any desired complex shape by being put in contact with one another as described previously. Honeycomb shapes are especially suited to this joining technique because the technique allows retention through firing of body alignment and cells openings which were established in the green body. This is not the case for other joining techniques which disrupt the fine cell geometry of extruded metal honeycombs.

For example, the honeycombs can be joined at least part of their outer configural surfaces, with their cells running either parallel or non-parallel with respect to one another. By outer configural surfaces is meant the outer surfaces surrounding the cells of the body. For example, the bodies are placed one on the other and the pressure generated by the weight of the top body or bodies acts over the surface or surfaces joining the bodies, thereby sintering together the mating surfaces. Such a complex body can be used in applications in which cross flow is utilized. The bodies can be positioned side by side so that all their cells are parallel. In such a case, a holding or clamping device can be employed to insure that the surfaces remain in contact during the sintering. The geometries of the individual component bodies, that is, size, shape and density and number of cells can vary depending on the application and the cross flow pattern that is desired. It is contemplated that any number of component honeycombs can make up the complex body, and that they can be arranged in any combination of parallel and non-parallel orientation and these can vary as far as overall size and shape of the bodies, and as far as number, size, and shape of cells. The honeycombs can be joined end to end (at the open cellular faces) so that the orientation of the cells of each honeycomb is rotated with respect to the neighboring honeycomb, the honeycombs being stacked end to end with the cells of each honeycomb rotated with respect to the neighboring honeycomb. This arrangement results in a convoluted flow path.

In the joining of honeycombs according to the present invention, the sacrificial parts of essentially the same metal composition but which are not to be joined as part of the complex body, are typically used to support the assembly during sintering. The release agent of the present invention is placed between the complex body assembly and the sacrificial parts to avoid sintering of these other parts to the complex body.

The sintering or firing time and temperature are sufficient to cause densification and, additionally, interdiffusion of the metals between the green bodies in a complex body. The sintering is done in a non-oxidizing atmosphere, preferably an atmosphere containing hydrogen, at a sufficient temperature for a sufficient time to bind the bodies to one another and form a densified body or densified unified complex body in the case of sintering more than one body together. The total porosity of the sintered body is about 0% to about 50%. It is preferred that the sintered body be essentially completely densified, that is for the purposes of the present invention, have a total porosity of no greater than about 2%. The preferred sintering atmosphere is hydrogen. A preferred sintering technique is to surround the green bodies with an enclosure in the vicinity of, or in contact with the bodies.

For bodies made of iron group metals, the preferred sintering temperatures are from about 1000° C. to about 1450° C. In general, if the sintering temperature is lower than about 1000° C., no sintering is achieved. Generally sintering conducted at temperatures higher than about 1450° C. caused deformation of the complex body or increases production cost, and is therefore, as a rule, undesirable.

The sintering time depends on factors such as temperature, size and number of the green bodies, design of the equipment, furnace atmosphere, etc. Also, the sintering temperature is determined so that any contained C, N, is present at a level of no greater than about 1% by weight each, and 0 is no greater than about 3% by weight. The sintering times are usually about 2 hours or longer.

Use of the release agent of the present invention on those surfaces which are not to be joined allows clean separation of those parts without resulting microstructural discontinuity at the separation surface(s). This provides uniform properties throughout the finished body. For example, because of the monolithic structure of the sintered body, electrical continuity is established relatively uniformly throughout the entire structure of the sintered body. Because some metal honeycombs are used as preheaters, and are resistively heated in that application, electrical continuity through the body is critical. Also, thermal shock resistance is not degraded by discontinuities between joined pieces.

To more fully illustrate the invention, the following non-limiting examples are presented. All parts, portions, and percentages are on a weight basis unless otherwise stated.

EXAMPLES

The firing of an extruded metal honeycomb structure requires that the structure be protected from conditions that can affect the quality of the finished product. This protection typically comes in the form of sacrificial parts which are thin ($\frac{1}{4}$", or 0.64 cm), flat, honeycomb structures of the same composition and geometry, commonly referred to as "cookies".

A cookie is placed between the part being sintered and the furnace hearth plate to act as a buffer between the product honeycomb part which is being sintered, and the furnace hearth plate. Without a buffer cookie, the shrinkage of the product part against the hearth plate, which does not shrink, applies drag forces to the part that can cause distortion.

A cookie is placed also on the top of the product part. By acting as a "getter", this cookie serves to protect the product honeycomb structure from furnace gas impurities that can cause contamination of the honeycomb during firing. Contamination by oxidation causes distortion of the product honeycomb and negatively affects its oxidation resistance.

In both cases, (top and bottom), the cookies are sacrificial and must be removed at the completion of the sintering process. Because metal honeycombs bond together during sintering, something must be done to prevent this so that the cookies can be removed. To accomplish this without causing damage to the honeycomb part from intergranular bonding, some form of parting agent is required. A mixture of fine alumina powder and isopropyl alcohol has been demonstrated to serve this function.

The following tests were performed to determine how various alumina/isopropyl alcohol ratios with fine and coarse aluminas affect the releasing ability between two adjoining parts.

Inventive Example 1

A fine alumina (Alcoa A-16) powder was mixed with isopropyl alcohol to form slurries as described in Table 1. Assemblies were made for the purpose of testing each slurry (release agent) as follows. The slurry mixture was applied using a hard faced rubber printing roller to the open cellular (axial) face of a cookie. The cookie is a green honeycomb part of about 5/16" (0.8 cm) in thickness. A honeycomb cube about 1" (2.54 cm) per side was placed on top of the coated cookie such that the applied slurry was between the open cellular faces of the two structures. One face of a second cookie was coated with the slurry and placed on top of the 1" (2.54 cm) honeycomb body, such that the slurry was between the two structures. The resulting stack assembly consisted of cookie:release agent:honeycomb part:release agent:cookie. Each assembly was fired in a sintering furnace of standard design in hydrogen using a sintering schedule of various ramps and holds to a peak temperature of about 1325° C. After being sintered to a temperature of about 1325° C., test samples were evaluated.

Observations and Results

Application:

The 5:2 slurry was too thick to apply successfully. The 5:3 slurry was difficult to apply and left an excessive coating of alumina on the coated surfaces. The 5:4, 1:1, and 1:5 slurries were easily applied.

Separation after sintering:

No parts were sintered with the 5:2 slurry. The parts with the 5:3 ratio slurry separated well, but there was excess alumina residue on the coated surfaces. This excess alumina plugged cells and caused significant warpage of the top cookie, thereby exposing the underlying honeycomb to gas contamination. Parts coated with slurry ratios of 5:4, 1:1, and 1:5 all separated well. Alumina residue diminished with decreasing alumina:IPA ratio in the slurry, but even the 5:4 was not excessive.

TABLE 1

| Alumina:IPA | Consistency | Separation | Residue |
| --- | --- | --- | --- |
| 1:5 | Thin | Good | Little |
| 1:1 | medium | Good | Moderate less than 5:4 ratio |
| 5:4 | Medium | Good | Moderate |
| 5:3 | Thick | Good | Excessive |
| 5:2 | Very thick (could not apply) | — | — |

Inventive Example 2

Tests were carried out using A-16 alumina. The alumina was mixed with IPA in four different ratios of alumina:IPA: 1:10, 1:7.5, 1:5, and 1:1. The IPA-alumina slurries were applied to metal honeycombs following the application procedure of Inventive Example 1.

Four stacks of green metal honeycomb parts were assembled. Each stack consisted of three parts and a top and bottom cookie. Each part was a quarter of a round part measuring about 8.9 cm in diameter. Each part was about 1.3 cm in height. Each cookie was about 1 cm in height. All pieces (3 parts and top and bottom cookies) had green cell geometries of about 47 cells/cm$^2$ (about 300 cells/in$^2$) with webs about 15 mm in thickness. One axial surface of each of the pieces in the stack was coated with one of the IPA:alumina ratio slurries so that all pieces were in contact with slurry. A different slurry was used in each stack. The stacks were loaded in the furnace for firing according to standard procedures as in Inventive Example 1. After sintering, the fired bodies had about 68 cells/cm (about 440 cells/in$^2$) with about 0.13 millimeter (about 0.005") web thickness. The stacks were removed from the furnace and the effectiveness of the release agent evaluated by visual observation and degree of part sticking.

Observations and Results

Application

The 1:7.5 and 1:10 slurries were very thin and required frequent agitation to keep the alumina in suspension so it could be transferred from slurry pan to roller to honeycomb. The 1:5 and 1:1 slurries were easily applied.

Separation after sintering

The 1:10 ratio slurry separated only the top cookie; the rest of the stack was bonded together. The 1:7.5 ratio separated the top cookie and the topmost part in the stack; the remainder of the stack was bonded together. Both the 1:5 and 1:1 slurries completely separated all parts in the stack. The 1:5 slurry left less residue than the 1:1 slurry. There was no pronounced deformation of the top cookie or excess residue with the 1:1 ratio slurry.

Applying slurry to stacks of parts shows that the relative effectiveness of different slurry ratios is in part dependent on the height of parts being stacked and/or web thickness, both of which result in increased mass. The greater the mass, the higher the ratio of alumina:IPA required.

TABLE 2

| Alumina:IPA | Consistency | Separation | Residue |
|---|---|---|---|
| 1:10 | Very thin | Top cookie only, slightly sticky | Very little |
| 1:7.5 | Thin | Top cookie and top piece | Very little |
| 1:5 | Thin | All pieces | Little |
| 1:1 | Medium | All pieces | Moderate |

Comparative Example

The procedure of Inventive Example 2 was followed but with C-701 alumina from Alcan, a relatively coarse alumina which was measured to have a median particle diameter of about 5 micrometers, a particle size distribution as measured by sedigraph, of 90% of the particles being $\leq 18.2$ μm, 50% $\leq 5.3$ μm, and 10% $\leq 3.1$ μm. This alumina was mixed with IPA in four different ratios of alumina:IPA: 1:10, 1:5, 1:1, and 5:3.

Observations and results

Application

The 1:10 and 1:5 mixtures were very difficult to apply. The 1:1 and 5:3 mixtures did not adhere well to the parts and were very difficult to apply uniformly.

Separation after sintering The 1:10 and 1:5 slurries did not act as release agents. The stacks of parts coated with these slurries were completely bonded together after sintering. Both the 1:1 and 5:3 ratio slurries left considerable alumina residue on the fired parts. This residue blocked cells on the coated faces. The top cookies on the stacks were warped upwards by the action of the alumina coating. These effects were present in both 1:1 and 5:3, but more pronounced in the latter. In terms of acting as a release agent, the 1:1 ratio slurry did keep top parts in the stack from sticking. However, the bottom surface of the lowermost part in the stack was bonded to the top of the bottom cookie. All parts in the 5:3 ratio slurry stack were easily separated, though all surfaces had cells plugged by excess alumina. With the 1:1 slurry, even though the top cookie was warped and cells were blocked on coated surfaces, both being the result of excess slurry application, the bottom part in the stack was bonded to the bottom cookie, indicating a lack of effectiveness of this slurry as a release agent. From these tests, it is shown that slurries of coarse alumina and IPA are not effective release agents for metal honeycombs of the present invention.

It should be understood that while the present invention has been described in detail with respect to certain illustrative embodiments thereof, it should not be considered limited to such but may be used in other ways without departing from the spirit of the invention and the scope of the appended claims.

What is claimed is:

1. A method of producing sintered metal parts, said method comprising:
   a) providing a plurality of green metal parts;
   b) applying a release agent to contacting surfaces of at least two of said parts, and forming an assembly of said parts, said release agent being a mixture consisting of alumina and a vehicle having a vaporization temperature of less than about 100° C. at atmospheric pressure, and being non-reactive with said alumina and said green metal parts, wherein when at least one of the parts having a contacting surface is a honeycomb structure, the median particle diameter of the alumina is no greater than about 3 micrometers, but wherein otherwise the median particle diameter of the alumina is no greater than about 5 micrometers in diameter;
   c) sintering said assembly; and
   d) separating the parts which are in contact with the release agent.

2. A method of claim 1 wherein at least one of said parts having a contacting surface is a honeycomb structure.

3. A method of claim 2 wherein the walls of said honeycomb structure are about 0.10 millimeters to about 0.20 millimeters thick in the green state.

4. A method of claim 2 wherein the median particle diameter of the alumina is no greater than about 1.5 micrometers.

5. A method of claim 2 wherein the median particle diameter of the alumina is no greater than about 0.5 micrometers.

6. A method of claim 1 wherein said vehicle is selected from the group consisting of alkanes, alkenes, alkynes, alcohols, amines, aromatics, esters, ketones, halogenated compounds, and combinations thereof.

7. A method of claim 6 wherein said vehicle is one or more alcohols.

8. A method of claim 7 wherein said alcohol is selected from the group consisting of methyl, ethyl, propyl, isopropyl, tertiary butyl alcohol, and combinations thereof.

9. A method of claim 8 wherein said alcohol is isopropyl alcohol.

10. A method of claim 9 wherein the weight ratio of said alumina to said isopropyl alcohol is greater than about 1:7.5 to about 5:4.

11. A method of claim 9 wherein the weight ratio of said alumina to said isopropyl alcohol is about 1:6 to about 5:4.

12. A method of claim 9 wherein the weight ratio of said alumina to said isopropyl alcohol is about 1:5 to about 1:1.

13. A method of claim 1 wherein the parts are made of metal which comprises one or more iron group metals, aluminum, and chromium.

14. A method of claim 13 wherein said iron group metal is iron.

15. A method of claim 13 wherein said metals are Fe, Al, and Cr.

16. A method of producing sintered metal parts, said method comprising:
   a) providing a plurality of green metal parts;
   b) applying a release agent to contacting surfaces of at least two of said parts, and forming an assembly of said parts, said release agent being a mixture consisting of alumina and a vehicle having a vaporization temperature of less than about 100° C. at atmospheric pressure, and being non-reactive with said alumina and said green metal parts, wherein when at least one of the parts having a contacting surface is a honeycomb structure the median particle diameter of the alumina is no greater than about 1.5 micrometers;
   c) sintering said assembly; and
   d) separating the parts which are in contact with the release agent.

17. A method of producing sintered metal parts, said method comprising:
   a) providing a plurality of green metal parts;
   b) applying a release agent to contacting surfaces of at least two of said parts, and forming an assembly of said parts, said release agent being a mixture consisting of alumina and isopropyl alcohol, the weight ratio of the alumina to the isopropyl alcohol being no greater than about 1:7.5 to about 5:4, wherein when at least one of the parts having a contacting surface is a honeycomb structure, the median particle diameter of the alumina is no greater than about 3 micrometers;
   c) sintering said assembly; and
   d) separating the parts which are in contact with the release agent.

* * * * *